March 4, 1930. F. A. KOLSTER 1,749,348
DIRECTIONAL RADIO SYSTEM
Filed Nov. 18, 1926
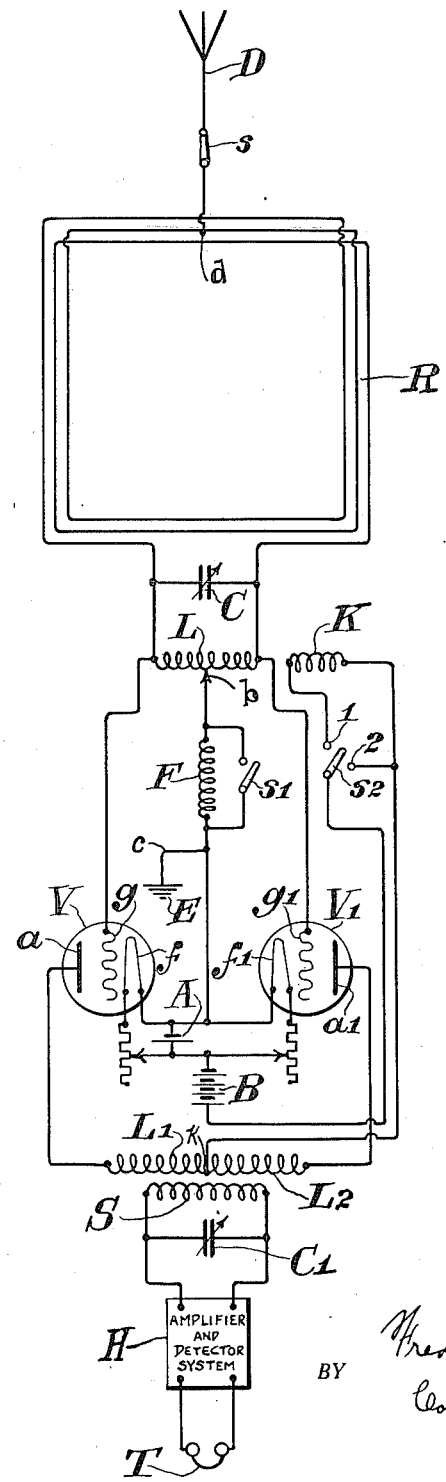
INVENTOR.
Frederick A. Kolster
Cornelius L. Ehret
BY his ATTORNEY.

Patented Mar. 4, 1930

1,749,348

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

DIRECTIONAL RADIO SYSTEM

Application filed November 18, 1926. Serial No. 149,047.

My invention relates to a system for determining the sense of direction of propagation of either transmitted or received electro-radiant energy; and more particularly my invention relates to radio compass, direction-finding, or interference-preventing systems.

In accordance with my invention, a radio system having a directional characteristic is utilized in combination with a radio system having substantially no directional characteristic, to constitute a composite system by which the direction of propagation of electro-radiant energy is determined when electrical symmetry obtains between the component systems, and the sense of direction of propagation is determined by transferring amplified high frequency energy from the one component system to the other without disturbing the condition of symmetry; and, more particularly, when the composite system is utilized for determining the sense of direction of a distant source of electro-radiant energy or of a radio beacon, received energy in the non-directional system is amplified and impressed upon the other system, without destroying the symmetry between them existing when determining the bearing of the distant source or beacon.

My invention resides in a system of the character hereinafter described and claimed.

For an illustration of one of the various forms my invention may take, reference is to be had to the accompanying drawing which is a diagrammatic illustration of electrical circuits involved.

For an understanding of my invention in both its broad and specific aspects there will be described a system utilizable for determining the direction or bearing and sense of direction of a radio beacon, transmitting station or other source of electro-radiant energy.

In the drawing R represents a rotatable loop or compass coil of one or more turns, constituting a directional element.

As well understood in the art, with the coil R there may rotate an indicator cooperating with a direction scale, such as the card of a magnetic, gyroscopic or other compass, or the card of a dumb compass.

The coil or inductance R is included in a closed circuit with the variable condenser C adapted to tune the closed circuit to the frequency of the received energy.

Connected in shunt to the condenser C is the coil or inductance L whose opposite terminals are connected, respectively, to the grids $g$ and $g^1$ of the thermionic amplifiers V, $V^1$. The filaments or cathodes $f$ and $f^1$ are connected in parallel with each other across the terminals of the source of current or battery A for rendering the cathodes electron-emissive. These cathodes are connected through the plate or anode circuit source or battery B to the midpoint $k$ of a coil or winding whose halves are indicated at $L^1$ and $L^2$, and whose remaining terminals are connected, respectively, with the anodes $a$ and $a^1$.

Coupled to the coil $L^1$, $L^2$ is the secondary coil S shunted by the variable tuning condenser $C^1$ to the terminals of which is connected the input circuit of an amplifier and detector system H, of any suitable type, such as one or more stages of radio frequency amplification, a detector and one or more stages of audio frequency amplification delivering to the telephone or other indicating instrument T.

In the common leads between the cathodes $f$ and $f^1$ and the midpoint $k$ of the coil $L^1$, $L^2$ is included a coil or winding K, in inductive relation to the aforesaid inductor coil L. The degree of coupling between the coils L and K may be varied by varying their relative positions, and the coupling between them will, therefore, be understood as preferably variable, though it may remain fixed when suitable or desirable. In the circuit of the coil K is the switch $S^2$ which, when engaging the contact 1, brings the coil K into circuit with the aforesaid common lead, and when in engagement with the contact 2 cuts out the coil K.

A contact $b$ is adjustable along and in contact with the inductance L and connects with the cathodes $f$, $f^1$ through the switch $S^1$, when closed, or through the resistance or choke coil F when the switch $S^1$ is open.

From a point below or beyond the impedance F, and from the cathodes $f$, $f^1$, is made a connection by conductor $c$ to earth or counter capacity E.

The closed circuit R, C constitutes a component system having a directional characteristic because of the rotatable loop or coil R; and a second system, in effect an open antenna system, having substantially no directional characteristic, is comprised by the closed circuit system, as a capacity area, and the connection to the earth or counter capacity E through the contact $b$, impedance F or switch $S^1$, and conductor $c$. The open antenna system may comprise also the antenna D which may be permanently connected to coil R at substantially its midpoint $d$ or a switch $s$ may be inserted to disconnect the antenna D when suitable or desirable.

The operation is as follows:

For determining the bearing or direction merely, as distinguished from sense of direction, of a distant transmitter or radio beacon, the switch $S^1$ is closed, thereby short-circuiting or rendering inoperative the impedance F, and the switch $S^2$ is thrown onto contact 2, cutting out coil K. The closed circuit is tuned to the frequency of the energy the direction of propagation of which is to be determined, by suitably adjusting the condenser C; and the contact $b$ is moved along the balancing inductance L to a position of sharp electrical symmetry of the closed circuit with respect to the earth connection or open antenna path. The coil R is rotated to position in which a critical response is obtained in the telephone T; generally and preferably to the position where the plane of the coil R is normal to the bearing or direction of the distant beacon or source, in which case zero or minimum the response is obtained in the telephone T, such zero or minimum response being more sharply determinable than is the maximum response in telephone T, obtainable when the plane of the coil R coincides with the bearing or direction.

Having so determined the bearing or direction of the beacon or distant source, the sense of bearing or direction thereof is obtained by giving the composite system, comprising the closed circuit and open antenna systems, a uni-lateral or a uni-directional characteristic without, however, disturbing the symmetry between the directional and non-directional systems previously obtained. Without moving the contact $b$ from the position determining symmetry of the closed circuit with respect to the open antenna path, the switch $S^1$ is opened, thereby inserting the impedance F in the earth connection; and the switch $S^2$ is thrown onto contact 1, thereby bringing the coupling coil K into circuit in the common anode circuit lead of the amplifiers V and $V^1$. With this condition of the circuits the operator then rotates the coil R, preferably from a position in which its plane is parallel to the bearing or direction of the distant beacon or source, and the sense of change of the magnitude of the signal in the telephone T is noted. By construction or suitable predetermination, decrease of signal under these circumstances will indicate that the distant beacon or source lies to the one side of the coil R, while, if the signal increases, it lies to the opposite side of the rotatable coil.

With the closed circuit system electrically symmetrical with respect to the earth connection $b$, E, the potentials of the grids $g$ and $g^1$ are affected in opposite senses by the high frequency received energy in the closed or loop circuit only; that is, one of the grids is positive when the other is negative, causing changes of current in the coils $L^1$ and $L^2$ in opposite senses, but since they are differentially coupled to the secondary S a signal is produced in the telephone T, enabling the operator by exploring rotation of the coil R to find the bearing either when the signal in the telephone T is a maximum or a minimum. Therefore, as regards received energy in the loop or closed circuit system only, the two audions V and $V^1$ are affected substantially equally and oppositely, without variation of anode circuit current, however, in the common B battery lead from the cathodes $f$, $f^1$ to the point $k$ between the coils $L^1$ and $L^2$. Therefore, as regards received energy in the loop or closed circuit only, with switch $S^2$ upon contact 1, there is no change of magnitude of high frequency current in the coil K, and in consequence there is no feed back or regenerative action effected by the back coupling K, L from the open antenna path into the loop or closed circuit.

On the other hand, received energy existing only in the antenna path operates upon the two audions V and $V^1$, in effect in parallel; that is, both grids $g$ and $g^1$ are positive or negative simultaneously, resulting in a differential effect in the coils $L^1$ and $L^2$ with respect to the secondary S, accompanied by a current variation in the common B battery lead, and, therefore, in the coupling coil K, which accordingly induces into the loop or closed circuit system an amplified current representative of the received energy in the open antenna path. The amplification of the open antenna current is not due to regenerative action, but is dependent only upon the simple amplifying action of the tubes V and $V^1$.

The current so induced by the coil K into the loop or closed circuit by its inductive effect upon the coil L cooperates either cumulatively or differentially with the received energy directly absorbed in the loop or closed circuit, and the two energies in cooperation produce more or less perfectly a cardioid or uni-directional or uni-lateral characteristic for determining sense of bearing of a distant station or beacon.

In consequence, the sense of direction or bearing may be determined by virtue of the fact that received energy in one of the component systems is transferred to the other without disturbing symmetry of the one system with respect to the other; and more particularly, the transfer of energy is accompanied by its amplification, without, however, causing regenerative or feed back action as regards the audion system.

Ordinarily, as regards the received energy in the open or antenna path, the difference of potential between the point $b$ and either terminal of the inductor $L$ is small, with corresponding small difference of potential between the grids $g$, $g^1$ and their associated cathodes $f$ and $f^1$. To procure a greater difference of potential the impedance F, either a resistance, or an inductance or choke coil, is utilized when the sense of direction is determined, for which purpose the audions V and $V^1$ are in a sense affected in parallel or similarly by the received energy in the existing field in the open antenna path.

By a system of the character described, uni-directional operation, that is, the determination of sense of direction or bearing, is possible without destroying or need to destroy the electrical symmetry previously existing between the two component systems in determining bearing or direction merely. Furthermore, the received energy in one of the systems alone, for example that in the open antenna system, is impressed upon the other or closed circuit system or loop after amplification. And aside from the degree of amplification of the energy of the one system impressed upon the other, the degree of coupling between the two systems, as affected, for example, by the coils K, L, may be regulated or varied at will.

While separate and distinct audions V and $V^1$ are indicated in the drawing, it will be understood that the anodes, grids and cathode structure may all be included within the same bulb or evacuated vessel.

What I claim is:

1. The method of determining the sense of direction of propagation of electro-radiant energy by utilization of a plurality of electrical systems having different directional characteristics and one of which is electrically symmetrical with respect to another, which comprises effecting high frequency energy transfer directly between each of said systems and a natural medium, cumulatively affecting a translating device by components of energy from one of said systems, differentially affecting said translating device by components of energy from another of said systems, and impressing energy of one of said systems upon said other during maintenance of electrical symmetry between said systems.

2. The method of determining the sense of direction of propagation of electro-radiant energy by utilization of a plurality of electrical systems having different directional characteristics and one of which is electrically symmetrical with respect to another, which comprises effecting high frequency energy transfer directly between each of said systems and a natural medium, amplifying the high frequency energy in one of said systems, and impressing the amplified energy upon said other of said systems during maintenance of electrical symmetry between said systems.

3. The method of determining the sense of direction of a source of electro-radiant energy by utilization of a plurality of electrical systems having different directional characteristics and one of which is electrically symmetrical with respect to another, which comprises impressing energy of one of said systems upon said other during maintenance of electrical symmetry between said systems, cumulatively affecting a translating device by components of energy from one of said systems, differentially affecting said translating device by components of energy from another of said systems, moving a part of said other system to vary the magnitude of said indication, and determining from the sense of the change of said magnitude the sense of direction of said source of electro-radiant energy.

4. The method of determining the sense of direction of a source of electro-radiant energy by utilization of a plurality of electrical systems having different directional characteristics and one of which is electrically symmetrical with respect to another, which comprises amplifying the energy of one of said systems, impressing the amplified energy upon said other during maintenance of electrical symmetry between said systems, producing an indication by the resultant of the energies in said other system, moving a part of said other system to vary the magnitude of said indication, and determining from the sense of the change of said magnitude the sense of direction of said source of electro-radiant energy.

5. The method of determining the bearing and sense of direction of a source of electro-radiant energy by utilization of a plurality of absorbing systems having different directional characteristics, which comprises effecting electrical symmetry of one of said systems with respect to another, determining the bearing by said one of said systems during maintenance of symmetry between them, impressing high frequency energy of said other of said systems upon said one of said systems during maintenance of symmetry between said systems, cumulatively affecting a translating device by components of energy from one of said systems, differentially affecting said translating device by components of energy from another of said systems, moving a part of said one of said systems to vary the magnitude of said indication, and determining from the sense of the change of said magnitude the sense of direction of said source.

6. The method of determining the bearing and sense of direction of a source of electroradiant energy by utilization of a plurality of absorbing systems having different directional characteristics, which comprises effecting electrical symmetry of one of said systems with respect to another, determining the bearing by said one of said systems during maintenance of symmetry between them, amplifying the high frequency energy in said other of said systems, impressing the amplified energy upon said one of said systems during maintenance of symmetry between said systems, producing an indication by the resultant of the energies in said one of said systems, moving a part of said one of said systems to vary the magnitude of said indication, and determining from the sense of the change of said magnitude the sense of direction of said source.

7. A directional radio system comprising component systems having different directional characteristics, means for effecting electrical symmetry between said component systems, a translating device, means to affect said device cumulatively by components of energy from one of said systems and differentially by components of energy from another of said systems, and means impressing high frequency energy of one of said component systems upon another component system during maintenance of symmetry between them.

8. A directional radio system comprising component systems having different directional characteristics, means for effecting electrical symmetry between said component systems, means for amplifying the high frequency energy in one of said component systems, and means for impressing the amplified energy upon another component system during maintenance of symmetry between them.

9. A directional radio receiving system comprising component absorbing systems having different directional characteristics, inductive means for effecting electrical symmetry between said component systems, means for indicating the magnitude of energy in at least one of the component systems, and means magnetically coupled to said inductive means for impressing energy of one of said component systems upon another during maintenance of symmetry between them.

10. A directional radio receiving system comprising component absorbing systems having different directional characteristics, means for effecting electrical symmetry between said component systems, means for indicating the magnitude of energy in at least one of the component systems, means for amplifying the high frequency energy in one of said systems, and means for impressing the amplified energy upon another of said systems during maintenance of electrical symmetry between them.

11. A directional radio system comprising a closed circuit including a rotatable coil, an antenna path, means for effecting electrical symmetry of said closed circuit with respect to said antenna path, a translating device, means to affect said device cumulatively by components of energy from said closed circuit and differentially by components of energy from said antenna path, and means transferring high frequency energy from said antenna path into said closed circuit while said closed circuit is symmetrical with respect to said antenna path.

12. A directional radio system comprising a closed circuit including a rotatable coil, an antenna path, means for effecting electrical symmetry of said closed circuit with respect to said antenna path, means for amplifying the high frequency energy in the antenna path, and means for impressing the amplified energy upon said closed circuit while said closed circuit is electrically symmetrical with respect to said antenna path.

13. A directional radio receiving system comprising a closed circuit including a rotatable coil, means for tuning the closed circuit, an open antenna path, means for effecting symmetry of said closed circuit with respect to said antenna path, a pair of three electrode thermionic devices, means associated therewith for causing their grids to be affected in opposite senses by the current in said closed circuit and in similar senses by the current in said antenna path, an indicating device controlled by the output circuits of said thermionic devices, and means for impressing upon said closed circuit anode circuit current representative of the current in said open antenna path.

14. A directional radio receiving system comprising a closed circuit including a rotatable coil, means for tuning the closed circuit, an open antenna path, means for effecting symmetry of said closed circuit with respect to said antenna path, a pair of three electrode thermionic devices, means associated therewith for causing their grids to be affected in opposite senses by the current in said closed circuit and in similar senses by the current in said antenna path, an indicating device controlled by the output circuits of said thermionic devices, and a coil inductively related to said closed circuit and included in a conductor common to the anode circuits of said thermionic devices.

15. A directional radio receiving system comprising a closed circuit including a rotatable coil, means for tuning the closed circuit, an open antenna path, an inductor coil in said closed circuit, means for effecting at a point between the terminals of said inductor coil symmetry of said closed circuit with respect to said antenna path, a pair of three electrode thermionic devices, means associated therewith for causing their grids to be affected in opposite senses by the current in said closed circuit and in similar senses by the current in said antenna path, an indicating device controlled by the output circuits of said thermionic devices, and a coil inductively related to said inductor coil and included in a conductor common to the anode circuits of said thermionic devices.

16. A directional radio-receiving system comprising a closed circuit including a rotatable coil, means for tuning the closed circuit, an open antenna path, means for effecting symmetry of said closed circuit with respect to said antenna path, an impedance, means for rendering said impedance operative or inoperative in said antenna path, a pair of three electrode thermionic devices, means associated therewith for causing their grids to be affected in opposite senses by the current in said closed circuit and in similar senses by the current in said antenna path, an indicating device controlled by the output circuits of said thermionic devices, and means for impressing upon said closed circuit anode circuit current representative of the current in said open antenna path.

17. A directional radio receiving system comprising a closed circuit including a rotatable coil, means for tuning the closed circuit, an open antenna path, means for effecting symmetry of said closed circuit with respect to said antenna path, a pair of three electrode thermionic devices, means associated therewith for causing their grids to be affected in opposite senses by the current in said closed circuit and in similar senses by the current in said antenna path, an indicating device controlled by the output circuits of said thermionic devices, a coil inductively related to said closed circuit and included in a conductor common to the anode circuits of said thermionic devices, and means for rendering said last named coil inoperative and for maintaining continuity of said conductor.

18. The method of determining the bearing and sense of direction of a source of electro-radiant energy by utilization of a plurality of absorption systems having different directional characteristics, which comprises effecting symmetry of said systems with respect to each other to prevent interchange of energy between them, moving a part of one of the systems to determine bearing, thereafter impressing amplified high frequency energy of one of said systems upon another of said systems during maintenance of symmetry therebetween, and moving part of one of said systems to determine sense of direction.

19. A directional radio system comprising component systems having different directional characteristics, means for effecting electrical symmetry between said component systems, means for impressing high frequency energy of one of said component systems upon another component system during maintenance of symmetry between them, and means to render said last named means effective or ineffective at will.

20. A directional radio system comprising component systems having different directional characteristics, means for effecting electrical symmetry between said component systems, means impressing high frequency energy of one of said component systems upon another component system during maintenance of symmetry between them to effect a uni-lateral characteristic of said directional system, and means to render said last named means inoperative to effect a bi-lateral characteristic of said directional system.

FREDERICK A. KOLSTER.